US012807064B2

(12) United States Patent
Hanselmann

(10) Patent No.: US 12,807,064 B2
(45) Date of Patent: Nov. 24, 2026

(54) METHOD FOR OUTPUTTING TO A ROAD USER AT LEAST ONE WARNING SIGNAL FROM A VEHICLE OPERATING FULLY AUTONOMOUSLY

(71) Applicant: Robert Bosch GmbH, Stuttgart (DE)

(72) Inventor: Michael Hanselmann, Korntal-Muenchingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 193 days.

(21) Appl. No.: 18/263,957

(22) PCT Filed: Feb. 24, 2022

(86) PCT No.: PCT/EP2022/054660

§ 371 (c)(1),
(2) Date: Aug. 2, 2023

(87) PCT Pub. No.: WO2022/238028

PCT Pub. Date: Nov. 17, 2022

(65) Prior Publication Data

US 2024/0123901 A1 Apr. 18, 2024

(30) Foreign Application Priority Data

May 14, 2021 (DE) ..................... 10 2021 104 349.2

(51) Int. Cl.
*B60Q 1/50* (2006.01)
*B60W 60/00* (2020.01)
(Continued)

(52) U.S. Cl.
CPC ......... *B60Q 1/547* (2022.05); *B60W 60/0027* (2020.02); *G06V 20/58* (2022.01);
(Continued)

(58) Field of Classification Search
CPC ........ B60Q 1/547; B60Q 1/507; B60Q 1/525; B60Q 5/006; B60W 60/0027;
(Continued)

(56) References Cited

U.S. PATENT DOCUMENTS

| | | | | |
|---|---|---|---|---|
| 2017/0190336 | A1* | 7/2017 | Vijayan | G08G 1/163 |
| 2018/0174460 | A1* | 6/2018 | Jung | G08G 1/16 |
| 2020/0307448 | A1 | 10/2020 | Shih | |

FOREIGN PATENT DOCUMENTS

| | | | | |
|---|---|---|---|---|
| DE | 102014221759 A1 | 4/2016 | | |
| DE | 102016206694 A1 * | 10/2017 | | B60W 40/08 |

(Continued)

OTHER PUBLICATIONS

Machine translation of DE 102018208105 downloaded off IP.com May 1, 2025 (Year: 2025).*

(Continued)

*Primary Examiner* — Kito R Robinson
*Assistant Examiner* — Tanya C Sienko
(74) *Attorney, Agent, or Firm* — NORTON ROSE FULBRIGHT US LLP

(57) ABSTRACT

A method for outputting to a road user at least one, in particular a visual and/or acoustic, warning signal from a vehicle operating fully autonomously. A gesture and/or an acoustic message from at least one vehicle occupant of the vehicle operating fully autonomously is captured first. In addition, a road user in the surroundings of the vehicle is detected. In addition, a viewing direction of the road user, in particular at a time of gesture capture or capture of the acoustic message, is detected. Following this, the warning signal from the vehicle operating fully autonomously is output to the road user depending on the captured gesture of the vehicle occupant and/or the acoustic message and the viewing direction of the road user.

13 Claims, 2 Drawing Sheets

(51) Int. Cl.
*G06V 20/58* (2022.01)
*G06V 20/59* (2022.01)
*G06V 40/20* (2022.01)

(52) U.S. Cl.
CPC .............. *G06V 20/59* (2022.01); *G06V 40/28* (2022.01); *B60W 2420/40* (2013.01); *B60W 2420/54* (2013.01); *G06V 2201/08* (2022.01)

(58) Field of Classification Search
CPC .......... B60W 2420/40; B60W 2420/54; G06V 20/58; G06V 20/59; G06V 40/28; G06V 2201/08
See application file for complete search history.

(56) References Cited

FOREIGN PATENT DOCUMENTS

| | | | | |
|---|---|---|---|---|
| DE | 102017216737 A1 | | 3/2019 | |
| DE | 102018208105 B3 | * | 3/2019 | B60W 30/08 |
| DE | 102017217745 A1 | | 4/2019 | |
| DE | 102018212056 A1 | * | 1/2020 | B60W 50/10 |
| DE | 102018222003 A1 | | 6/2020 | |

OTHER PUBLICATIONS

Machine translation of DE 102018212056 downloaded off IP.com May 1, 2025 (Year: 2025).*

Machine translation of DE 102016206694 downloaded off IP.com May 1, 2025 (Year: 2025).*

Pedestrian Motion Detection & Pedestrian Communication (P2I & V2P) M. N. Tahir et al., 2020 International Conference on Software, Telecommunications and Computer Networks (SoftCOM) (2020, pp. 1-3) (Year: 2020).*

"Vehicle Automation—Other Road User Communication and Coordination: Theory and Mechanisms" by J. Domeyer et al. IEEE Access published Jan. 24, 2020. (Year: 2020).*

International Search Report for PCT/EP2022/054660, Issued Jun. 27, 2022.

* cited by examiner

METHOD FOR OUTPUTTING TO A ROAD USER AT LEAST ONE WARNING SIGNAL FROM A VEHICLE OPERATING FULLY AUTONOMOUSLY

FIELD

The present invention relates to a method for outputting to a road user at least one, in particular a visual or acoustic, warning signal from a vehicle operating fully autonomously. In addition, the present invention relates to a computing unit which is designed to carry out the method, and to a vehicle with the computing unit, with at least a first environment capture unit, at least a second environment capture unit and a signal transmitter.

BACKGROUND INFORMATION

A method for outputting to a pedestrian as road user a visual warning signal from a vehicle operating fully autonomously is described in German Patent Application No. DE 10 2014 221 759 A1. As a result of the generated visual signal, it is indicated to the pedestrian that the vehicle is operating fully autonomously.

Proceeding from this German application, it is an object of the present invention to develop a method which outputs such a warning signal only in the event of a specific hazardous situation.

SUMMARY

In order to achieve the object, a method is provided according to the present invention for outputting to a road user at least one, in particular a visual or acoustic, warning signal from a vehicle operating fully autonomously. In addition, a computing unit and a vehicle are provided according to the present invention.

According to an example embodiment of the present invention, in the method for outputting to a road user at least one, in particular a visual or acoustic, warning signal from a vehicle operating fully autonomously, a gesture or an acoustic message from at least one vehicle occupant of the vehicle operating fully autonomously is captured. The gesture can be, for example, a hand signal or a head movement. The acoustic message from the vehicle occupant may be, for example, a single word or even an exclamation. The gesture and/or the acoustic message is captured by means of a first environment capture unit of the vehicle operating fully autonomously. This can be, for example, a camera that captures the interior of the vehicle operating fully autonomously. Alternatively or additionally, it can also be a microphone. The vehicle occupant in the vehicle operating fully autonomously is in particular the vehicle occupant who is in the driver's seat of the vehicle. In addition, in the method a road user in the surroundings of the vehicle is detected. The road user is any object which by an action can intervene in the traffic situation, in particular of the vehicle operating fully autonomously. The road user is detected by means of a second environment capture unit of the vehicle operating fully autonomously. The second environment capture unit is, for example, a radar sensor and/or a lidar sensor. In the following, a viewing direction of the road user is detected. The viewing direction is detected in particular at a time of gesture capture and/or capture of the acoustic message. The warning signal from the vehicle operating fully autonomously is then output to the road user depending on the captured gesture of the vehicle occupant and the detected viewing direction of the road user.

Alternatively or additionally, according to an example embodiment of the present invention, the warning signal from the vehicle operating fully autonomously is output to the road user depending on the captured acoustic message from the vehicle occupant and the detected viewing direction of the road user. The warning signal is output to ensure that the road user does not interpret the occupant's gesture or verbal message as indicating manual control over the vehicle, particularly when the vehicle is operating fully autonomously in a manner that may be inconsistent with the occupant's gesture or verbal message. The warning signal signals to the road user that the vehicle is being operated fully autonomously and the vehicle occupant thus does not currently have control over the vehicle. The gesture and/or verbal message from the vehicle occupant can occur consciously or unconsciously.

Preferably, according to an example embodiment of the present invention, a viewing direction of the vehicle occupant of the vehicle operating fully autonomously is also detected, in particular at the time of gesture capture and/or of the acoustic message. The warning signal is then output to the road user only if the vehicle occupant of the vehicle operating fully autonomously and the road user are looking at one another at the time of gesture capture and/or of the acoustic message. In this way, unconscious gestures by and/or verbal messages from the vehicle occupant of the vehicle operating fully autonomously are excluded to a greater degree.

According to the present invention, in the method, an invitation directed at the road user from the vehicle occupant of the vehicle operating fully autonomously is preferably determined depending on the captured gesture and/or the captured acoustic message. This means that it is determined whether the captured gesture and/or the captured acoustic message is inviting the road user to perform a specific action. In particular, artificial intelligence with an algorithm based on machine learning or deep learning is used to investigate the invitation. Alternatively, the algorithm can also be based on a classic AI method. In the following, a first movement trajectory of the road user is determined on the basis of the determined invitation directed at the road user by the vehicle occupant. In addition, a second movement trajectory of the vehicle operating fully autonomously is determined and then the first and second movement trajectories are compared with one another. The warning signal takes place depending on the comparison. The warning signal preferably takes place if the first and second movement trajectories cross during the comparison, in particular at a common point in time. Preferably, the invitation directed at the road user by the vehicle occupant signals that the vehicle operating fully autonomously is granting the road user priority. Such an invitation can be understood, for example, by the vehicle occupant nodding and/or by a hand movement from one side to the other. Even an exclamation by the vehicle occupant as an acoustic message, such as "Walk on or drive on!", "Go ahead into my lane!" or "Go ahead and cross the road!", can signal to the road user that he is being given priority.

According to an example embodiment of the present invention, in the method, environmental objects in the surroundings of the detected road user are preferably also detected. The detected environmental objects are in particular a crosswalk and/or a road sign. A priority rule is then determined on the basis of the detected environmental object. The warning signal is then output additionally on the basis of the determined priority rule. For example, a detected priority sign can specify the traffic rule whereby the road user has priority over the vehicle operating fully autonomously, irrespective of the gesture and/or acoustic message from the vehicle occupant of the vehicle operating fully autonomously. In this context, a detected crosswalk can also indicate, for example, that a pedestrian as road user has priority anyway to cross the road before the vehicle operating fully autonomously. In this case, a warning signal to the road user is not necessary, since it can be assumed that the vehicle operating fully autonomously will comply with the traffic rules. In this case, a generated warning signal could therefore lead to unnecessary confusion on the part of the road user.

The detected road user is preferably a pedestrian or a cyclist. Pedestrian or cyclists can often be accorded priority by eye contact with the vehicle occupant of the vehicle operating fully autonomously. Alternatively, the detected road user is preferably a further vehicle occupant, in particular a vehicle driver, in a further vehicle, which is in particular being operated manually. Alternatively, the detected road user is preferably a further vehicle operating fully autonomously. In this context, the viewing direction of the further detected vehicle operating fully autonomously is characterized by an environment capture region of at least one environment capture device of the further vehicle operating fully autonomously. This means that a check is made as to whether the vehicle operating fully autonomously with the vehicle occupant making the gesture and/or the acoustic message is located within the environment capture region of the environment capture device of the further vehicle operating fully autonomously. Only then can the further vehicle operating fully autonomously also detect the vehicle occupant and respond to his gesture and/or acoustic message.

A further subject matter of the present invention is a computing unit which is designed to carry out the method described above. In this context, according to an example embodiment of the present invention, the computing unit is preferably designed to acquire first sensor data relating to a gesture and/or an acoustic message from at least one vehicle occupant of the vehicle operating fully autonomously. In addition, the computing unit is designed to acquire second sensor data relating to a road user detected in the surroundings of the vehicle. In addition, the computing unit is designed to acquire third sensor data relating to a detected viewing direction of the road user, in particular at a time of gesture capture and/or capture of the acoustic message. Furthermore, the computing unit is designed to generate a warning signal directed at the road user from the vehicle operating fully autonomously depending on the acquired first, second and third sensor data.

A further subject matter of the present invention is a vehicle which is in particular operated fully autonomously. According to an example embodiment of the present invention, the vehicle comprises the above-described computing unit and at least one first environment capture unit for detecting a gesture and/or an acoustic message from at least one vehicle occupant of the vehicle operating fully autonomously. In addition, the vehicle has at least one second environment capture unit for detecting a road user in the surroundings of the vehicle. In addition, the vehicle has a signal transmitter for outputting to the road user a warning signal, in particular a visual and/or an acoustic warning signal, from the vehicle operating fully autonomously.

DETAILED DESCRIPTION OF EXAMPLE EMBODIMENTS

Figure 1:
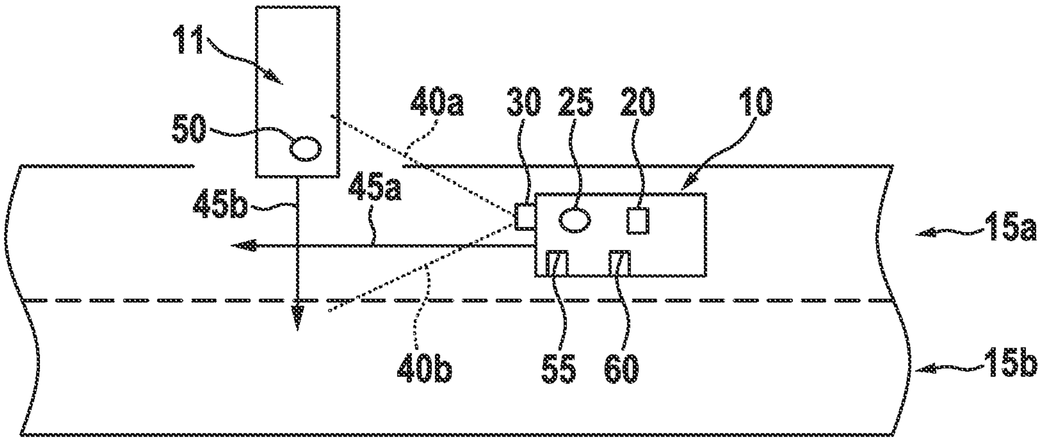
FIG. 1 schematically shows a first situation with a vehicle operating fully autonomously.

FIG. 1 schematically shows a vehicle 10 operating fully autonomously which is traveling on a roadway with two lanes 15*a* and 15*b*. The vehicle 10 comprises a computing unit 60, a first environment capture unit 55, a second environment capture unit and a signal transmitter 20. The first environment capture unit is designed to capture a gesture and/or an acoustic message from a vehicle occupant 25 in the vehicle 10 operating fully autonomously. Here, the vehicle occupant 25 is the person who is occupying the driver's seat. In this exemplary embodiment, the first environment capture unit 55 is designed as an interior camera. The second environment capture unit 30 is designed to detect a further vehicle occupant 50 in another vehicle 11 as a road user. The further vehicle occupant 50 is a driver of a manually operated vehicle. In this case, the second environment capture unit 30 is likewise designed to detect a viewing direction of the road user. The viewing direction is detected at a time of gesture capture and/or capture of the acoustic message. In this exemplary embodiment, the second environment capture unit 30 is designed as a camera unit and has a capture region which is bounded by the two lines 40*a* and 40*b* shown. The computing unit 60 is designed to acquire in the form of first sensor data the sensor data, acquired by means of the first environment capture unit 55, relating to the gesture and/or acoustic message from the vehicle occupant 25 of the vehicle 10 operating fully autonomously. Furthermore, the computing unit 60 is designed to acquire in the form of second sensor data the sensor data, acquired by means of the second environment capture unit 30, relating to the further vehicle occupant 50.

Furthermore, the computing unit 60 serves to acquire in the form of third sensor data the sensor data, acquired by means of the second environment capture unit 30, relating to the viewing direction of the road user. Depending on the acquired first, second and third sensor data, the computing unit 60 is designed to generate a control signal for the signal transmitter 20. In this case, the signal transmitter 20 is designed as a visual signal transmitter which radiates light beams into the environment.

In the situation shown schematically in FIG. 1, the vehicle occupant 25 makes a gesture in the form of a nod and a hand movement from the right to the left. In this case, the computing unit 60 generates a control signal for the signal transmitter 20, which leads to the signal transmitter 20 switching on.

Optionally, the first environment capture unit 55 is further designed to detect a viewing direction of the vehicle occupant 25, in particular at the time of gesture capture and/or of the acoustic message. Here, the computing unit 60 is designed to acquire in the form of fourth sensor data the sensor data, acquired by means of the first environment capture unit 55, relating to the viewing direction of the vehicle occupant of the vehicle operating fully autonomously. In this case, the computing unit 60 generates the control signal for switching on the signal transmitter 20 only if the vehicle occupant of the vehicle operating fully autonomously and the road user are looking at one another at the time of gesture capture and/or of the acoustic message.

Further optionally, the computing unit 60 is designed to determine an invitation directed at the road user by the vehicle occupant of the vehicle operating fully autonomously depending on the captured gesture and/or the captured acoustic message. In this context, the computing unit 60 has artificial intelligence with an algorithm based on machine learning or deep learning. In the situation shown, the further vehicle occupant 50 can interpret the gesture as an invitation to take priority. Furthermore, the computing unit 60 is designed to predict a first movement trajectory 45*a* of the further vehicle 11 on the basis of the determined invitation to the road user 50 from the vehicle occupant 25. The further vehicle occupant 50 is looking at the vehicle occupant 25 at the time when the vehicle occupant 25 makes the gesture and can interpret this gesture as an invitation to take priority. This results in a future first movement trajectory 45*a* which intends crossing the lane 15*a*. Furthermore, the computing unit 60 is designed to determine a second movement trajectory 45*b* of the vehicle 10 operating fully autonomously. Due to an absence of road signs indicating a priority for the further vehicle 11, the vehicle 10 operating fully autonomously does not have the intention of braking at the time when the gesture is made but instead continues to move forward at a constant speed. In the following, the computing unit 60 compares the first movement trajectory 45*a* with the second movement trajectory 45*b* and in this case comes to the conclusion that if the two movement trajectories 45*a* and 45*b* continue unchanged, the two trajectories 45*a* and 45*b* will intersect. In this case, the computing unit 60 generates a control signal for outputting a warning signal to the further vehicle occupant 50 by means of the signal transmitter 20.

Further optionally, the computing unit 60 is also designed to transmit, depending on the output warning signal, a further control signal to a drive unit (not shown here) of the vehicle operating fully autonomously for effecting a transition into a safe state.

Figure 2:
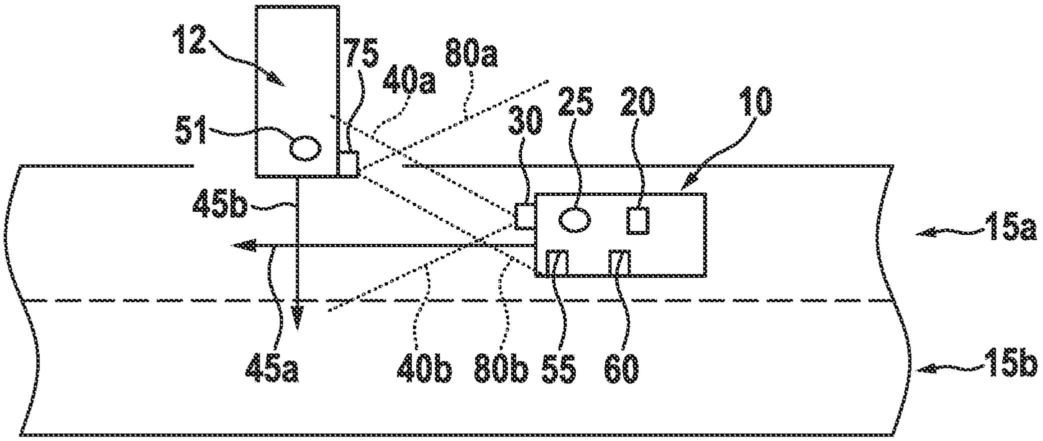
FIG. 2 schematically shows a second situation with a vehicle operating fully autonomously.

FIG. 2 shows a further situation with the vehicle 10 operating fully autonomously. In contrast to FIG. 1, the road user is a further vehicle 12 operating fully autonomously with a further vehicle occupant 51. The further vehicle operating fully autonomously has a third environment capture unit 75, which in this case is designed as a further camera unit. The third environment capture unit 75 has a further environment capture region which is bounded by the two lines 80*a* and 80*b* shown. The viewing direction of the further vehicle 12 operating fully autonomously is characterized by the environment capture region of the third environment capture device 75 of the further vehicle 12 operating fully autonomously. This means that the computing unit 60 checks whether the vehicle 10 operating fully autonomously with the vehicle occupant 25, who in this case makes the gesture, is located within the environment capture region of the third environment capture device 75 of the further vehicle 12 operating fully autonomously. Only then can the further vehicle 12 operating fully autonomously also detect the vehicle occupant 25 and respond to his gesture.

Figure 3:
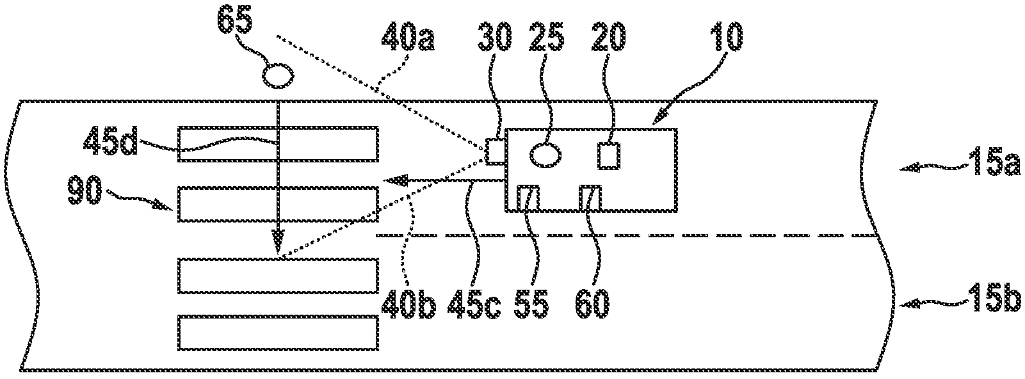
FIG. 3 schematically shows a third situation with a vehicle operating fully autonomously.

FIG. 3 shows a further situation with the vehicle 10 operating fully autonomously. In contrast to the previous figures, the road user here is a pedestrian 65.

In this exemplary embodiment, the second environment capture unit 30 is additionally designed to detect environmental objects in the surroundings of the pedestrian 65, in addition to detecting road users. In this case, the environmental object is a crosswalk 90, which is also referred to as a pedestrian crossing. The computing unit 60 is designed to acquire in the form of fifth sensor data the sensor data, acquired by means of the second environment capture unit 30, relating to the environmental object and to determine a priority rule depending on the acquired fifth sensor data. Depending on the priority rule determined, the computing unit 60 then generates a control signal for the signal transmitter 20.

In this case, the detected crosswalk 90 indicates that the pedestrian 65 has, regardless of the gesture made by the vehicle occupant 25, priority over the vehicle 10 operating fully autonomously and is thus allowed to cross the road first. Here, a control signal for switching on the signal transmitter 20 is not generated by means of the computing unit 60, since it can be assumed that the vehicle 10 operating fully autonomously will comply with the traffic rules and thus come to a stop before the crosswalk 90. This is additionally confirmed by the computing unit 60 by comparing the determined first movement trajectory 45*d* of the pedestrian 65 and the determined second movement trajectory 45*c* of the vehicle 10 operating fully autonomously. The first movement trajectory 45*d* and second movement trajectory 45*c* do not intersect.

Figure 4:
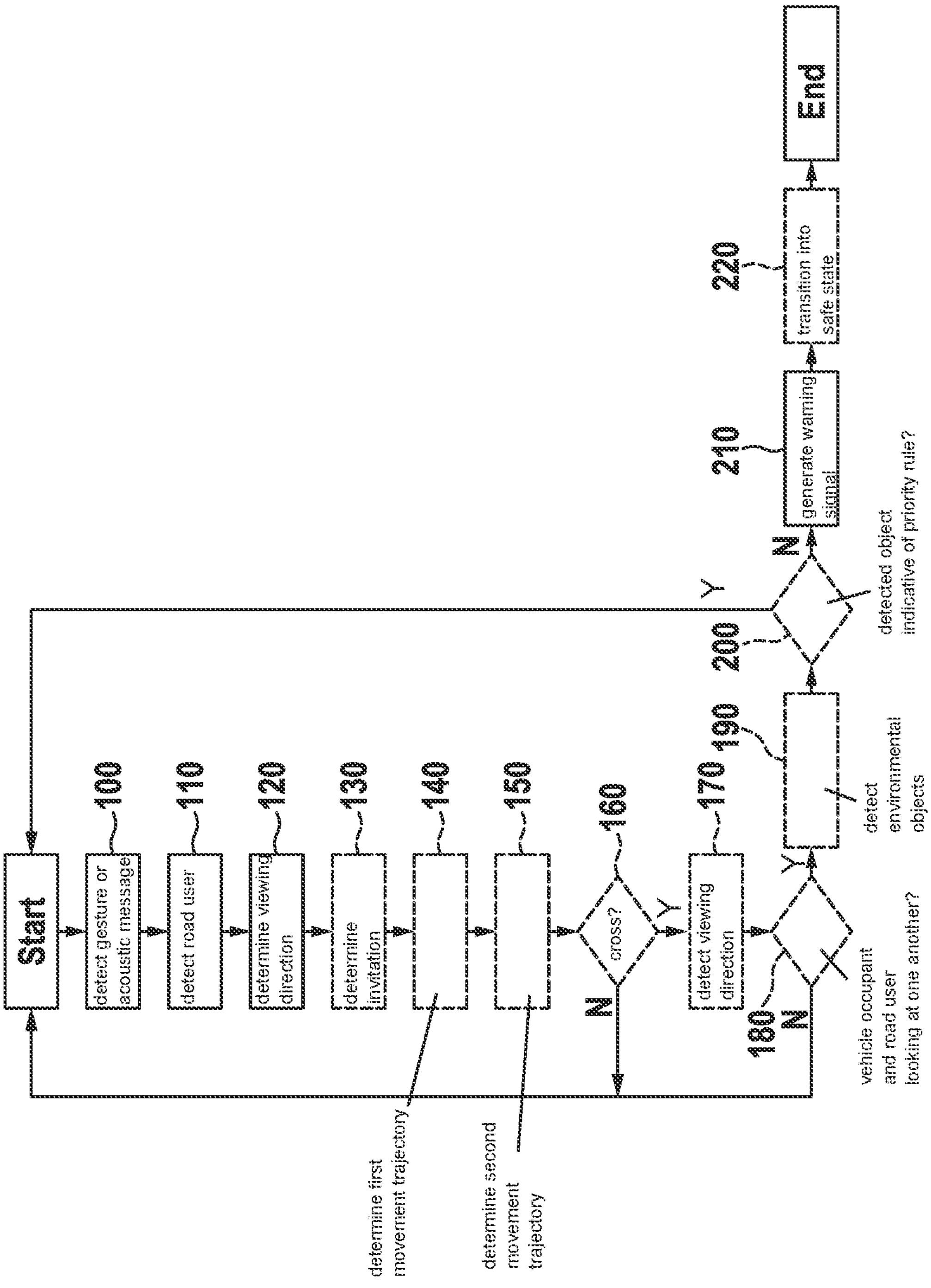
FIG. 4 schematically shows a method for outputting to a road user at least one, in particular a visual or acoustic, warning signal from a vehicle operating fully autonomously, according to an example embodiment of the present invention.

FIG. 4 shows in the form of a flow chart a method for outputting to a road user at least one, in particular a visual or acoustic, warning signal from a vehicle operating fully autonomously.

In this case, a gesture and/or an acoustic message from at least one vehicle occupant of the vehicle operating fully autonomously is first detected in a method step 100. Next, in a method step 110, a road user in the surroundings of the vehicle is detected. In a following method step 120, a viewing direction of the road user, in particular at a time of gesture capture or capture of the acoustic message, is determined. Thereupon, in a method step 210, the warning signal from the vehicle operating fully autonomously is output to the road user depending on the captured gesture of the vehicle occupant and/or the acoustic message and also the viewing direction of the road user. The method is then terminated.

In an optional method step 130, an invitation directed at the road user by the vehicle occupant of the vehicle operating fully autonomously is determined depending on the captured gesture and/or the captured acoustic message. Following this, in a method step 140, a first movement trajectory of the road user is determined on the basis of the determined invitation directed at the road user by the vehicle occupant. A second movement trajectory of the vehicle operating fully autonomously is then determined in a method step 150. Following this, in method step 160, the determined first and second movement trajectories are compared with one another and a check is made as to whether the two movement trajectories would cross. If there is an intersection in this case, the warning signal is output in method step 210. If there is no intersection, the method will be started again from the beginning or alternatively terminated.

In a further optional method step 170, the viewing direction of the vehicle occupant of the vehicle operating fully autonomously is detected, in particular at the time of gesture capture and/or of the acoustic message. In a subsequent method step 180, a check is made as to whether the vehicle occupant of the vehicle operating fully autonomously and the road user are looking at one another at the time of gesture capture and/or of the acoustic message. If the vehicle occupant and the road user are looking at one another, the warning signal will be output in method step 210. However, if the vehicle occupant of the vehicle operating fully autonomously is not looking at the road user at the time of the generated gesture or verbal message, the method will be terminated or alternatively started from the beginning.

In a further optional method step 190, environmental objects are detected in the surroundings of the road user, in particular a crosswalk and/or a road sign. Thereupon, in a method step 200, a check is made as to whether the detected environmental object is indicative of a priority rule. If it turns out in this case that the vehicle operating fully autonomously has priority over the road user due to the determined priority rule, the warning signal will be generated in method step 210. If, however, it turns out that the road user has, as a result of the determined priority rule, priority over the vehicle operating fully autonomously irrespective of the gesture and/or acoustic message made by the vehicle occupant of the vehicle operating fully autonomously, the method will be ended or alternatively started from the beginning.

In a further optional method step 220, the vehicle operating fully autonomously transitions into a safe state if the warning signal was generated in method step 210.

What is claimed is:

1. A method for outputting to a road user a visual or acoustic warning signal from a vehicle operating fully autonomously, the method comprising the following steps:
- capturing a gesture and/or an acoustic message from at least one vehicle occupant of the vehicle operating fully autonomously;
- detecting a road user in surroundings of the vehicle;
- detecting a viewing direction of the road user at a time of gesture capture and/or capture of the acoustic message;
- outputting to the road user the warning signal from the vehicle operating fully autonomously depending on the captured gesture of the vehicle occupant and/or the acoustic message and the viewing direction of the road user;
- determining an invitation directed at the road user from the vehicle occupant of the vehicle operating fully autonomously; and
- determining a predicted movement trajectory of the road user based on the determined invitation from the vehicle occupant.

2. The method according to claim 1, wherein a viewing direction of the vehicle occupant of the vehicle operating fully autonomously is detected at the time of gesture capture and/or capture of the acoustic message, wherein the warning signal is output to the road user when the vehicle occupant of the vehicle operating fully autonomously and the road user are looking at one another at the time of gesture capture and/or capture of the acoustic message.

3. The method according to claim 1, further comprising the following steps:
- detecting one or more environmental objects in the surroundings of the road user including a crosswalk and/or a road sign;
- determining a priority rule depending on the detected environmental object; and
- outputting the warning signal additionally depending on the determined priority rule.

4. The method according to claim 1, wherein the detected road user is a pedestrian or a cyclist.

5. The method according to claim 1, wherein the detected road user is a driver in a further manually operated vehicle.

6. The method according to claim 1, wherein the detected road user is a second vehicle operating fully autonomously.

7. The method according to claim 6, wherein the viewing direction of the detected second operating fully autonomously is characterized by an environment capture region of at least one environment capture device of the second vehicle that is operating fully autonomously.

8. The method according to claim 1, wherein the vehicle operating fully autonomously transitions into a safe state depending on the output warning signal.

9. A method for outputting to a road user a visual or acoustic warning signal from a vehicle operating fully autonomously, the method comprising the following steps:
- capturing a gesture and/or an acoustic message from at least one vehicle occupant of the vehicle operating fully autonomously;
- detecting a road user in surroundings of the vehicle;
- detecting a viewing direction of the road user at a time of gesture capture and/or capture of the acoustic message;
- outputting to the road user the warning signal from the vehicle operating fully autonomously depending on the captured gesture of the vehicle occupant and/or the acoustic message and the viewing direction of the road user;
- determining, depending on the captured gesture and/or the captured acoustic message, an invitation directed at the road user from the vehicle occupant of the vehicle operating fully autonomously;
- determining a first movement trajectory of the road user depending on the determined invitation directed at the road user by the vehicle occupant;
- determining a second movement trajectory of the vehicle operating fully autonomously;
- comparing the first and second moving trajectories to one another; and
- outputting a warning signal depending on the comparison.

10. The method according to claim 9, wherein the invitation of the vehicle occupant signals to the road user that the vehicle operating fully autonomously is granting the road user priority.

11. A computing unit configured to output to a road user a visual or acoustic warning signal from a vehicle operating fully autonomously, the computing unit configured to:
- capture a gesture and/or an acoustic message from at least one vehicle occupant of the vehicle operating fully autonomously;
- detect a road user in surroundings of the vehicle;
- detect a viewing direction of the road user at a time of gesture capture and/or capture of the acoustic message;
- output to the road user the warning signal from the vehicle operating fully autonomously depending on the captured gesture of the vehicle occupant and/or the acoustic message and the viewing direction of the road use;
- determine an invitation directed at the road user from the vehicle occupant of the vehicle operating fully autonomously; and
- determine a predicted movement trajectory of the road user based on the determined invitation from the vehicle occupant.

12. The computing unit according to claim 11, wherein the computing unit is configured to:
- acquire first sensor data relating to the gesture and/or an acoustic message of the at least one vehicle occupant of the vehicle operating fully autonomously;
- acquire second sensor data relating to the road user detected in the surroundings of the vehicle;
- acquire third sensor data relating to the detected viewing direction of the road user at the time of gesture capture and/or capture of the acoustic message; and generate a warning signal directed at the road user from the vehicle operating fully autonomously depending on the acquired first, second and third sensor data.

13. A vehicle operating fully autonomously, comprising:

a computing unit configured to output to a road user a visual or acoustic warning signal from the vehicle operating fully autonomously, the computing unit configured to:

capture a gesture and/or an acoustic message from at least one vehicle occupant of the vehicle operating fully autonomously, detect a road user in surroundings of the vehicle, detect a viewing direction of the road user at a time of gesture capture and/or capture of the acoustic message, output to the road user the warning signal from the vehicle operating fully autonomously depending on the captured gesture of the vehicle occupant and/or the acoustic message and the viewing direction of the road user, acquire first sensor data relating to the gesture and/or an acoustic message of the at least one vehicle occupant of the vehicle operating fully autonomously, acquire second sensor data relating to the road user detected in the surroundings of the vehicle, acquire third sensor data relating to the detected viewing direction of the road user at the time of gesture capture and/or capture of the acoustic message, and generate a warning signal directed at the road user from the vehicle operating fully autonomously depending on the acquired first, second and third sensor data at least one first environment capture unit configured to capture the gesture and/or acoustic message from the at least one vehicle occupant of the vehicle operating fully autonomously;

at least one second environment capture unit configured to detect the road user in the surroundings of the vehicle; and a signal transmitter configured to output to the road user the warning signal from the vehicle operating fully autonomously, the warning signal being a visual and/or acoustic warning signal, wherein the computing unit is configured to:

determine an invitation directed at the road user from the vehicle occupant of the vehicle operating fully autonomously; and determine a predicted movement trajectory of the road user based on the determined invitation from the vehicle occupant.

* * * * *